INVENTOR.
Earle R. Wall, Jr.
BY
Paul Fitzpatrick
ATTORNEY

INVENTOR
Earle R. Wall, Jr.
BY
Paul Fitzpatrick
ATTORNEY

Jan. 26, 1971  E. R. WALL, JR  3,558,237
VARIABLE TURBINE NOZZLES
Filed June 25, 1969  4 Sheets-Sheet 4

INVENTOR
Earle R. Wall, Jr.
BY
Paul Fitzpatrick
ATTORNEY

United States Patent Office 3,558,237
Patented Jan. 26, 1971

3,558,237
VARIABLE TURBINE NOZZLES
Earle R. Wall, Jr., Indianapolis, Ind., assignor to General Motors Corporation, Detroit, Mich., a corporation of Delaware
Filed June 25, 1969, Ser. No. 836,423
Int. Cl. F01d 25/12, 25/26, 25/02
U.S. Cl. 415—115
21 Claims

ABSTRACT OF THE DISCLOSURE

Turbine nozzle structures with variable setting vanes and shroud structures to support the vanes, having porous facings which are adapted for transpiration cooling by air flowing through the facings. Arrangements for mounting the facings on the structural rings of the shrouds and for supporting the parts with freedom for relative expansion. Also, arrangements for sealing against undue leakage between the pivoting vanes and the shroud facings.

---

The invention herein described was made in the course of work under a contract or subcontract thereunder with the Department of Defense.

My invention is directed to improved structures of turbine nozzle having variable setting vanes, and other such structures. The principal purpose of my invention is to provide a variable turbine nozzle or other turbomachine stator having adaptation to very high temperature motive fluid and including porous metal facings defining the motive fluid path through the nozzle. The invention is concerned with means for supporting the facings and for sealing against undue leakage between the movable vanes and the facing; also with improved means for rotating the vanes in unison to vary the setting.

The principal objects of my invention are to improve the efficiency, durability, and practically of gas turbine engines; to provide variable setting turbine nozzles particularly adapted to high temperature service, and to provide readily fabricated and repaired structure of a cooled turbine nozzle. Other objects are to provide improved sealing between rotatable vanes and the structures in which they are mounted and improved arrangements for mounting and rotating the vanes of a variable vane cascade.

The nature of my invention and the advantages thereof will be clear to those skilled in the art from the succeeding detailed description and accompanying drawings of preferred embodiments of my invention. It is to be understood that these are presented by way of illustration and explanation of the invention, and not in any limiting sense.

Referring to the drawings, FIG. 1 is a partial sectional view of a two stage gas turbine taken in a plane containing the axis of rotation of the turbine rotors and illustrating two different forms of variable setting nozzles.

I am aware that various designs of variable stator vanes for turbomachines have been proposed. Some which might be cited as illustrative examples are disclosed in the following U.S. patents: Feilden, No. 2,651,492, for Turbine, Sept. 8, 1953; Morley, No. 2,671,634, for Adjustable Stator Blade and Shroud Ring Arrangement for Axial Flow Turbines and Compressors, Mar. 9, 1954; Burge, No. 3,079,128, for Sealing and Securing Means for Turbomachine Blading, Feb. 26, 1963; and Fitton, No. 3,367,628, for Movable Vane Unit, Feb. 6, 1968. Transpiration cooled facings for turbine nozzle shrouds are disclosed and claimed in the copending application of Emmerson, Ser. No. 691,834, for Turbine Cooling, filed Dec. 19, 1967, of common ownership with this application. The Emmerson nozzle structure is not a variable setting vane type and, as will be apparent from the succeeding description, my nozzle structures are quite different from those of Emmerson.

Figure 1:
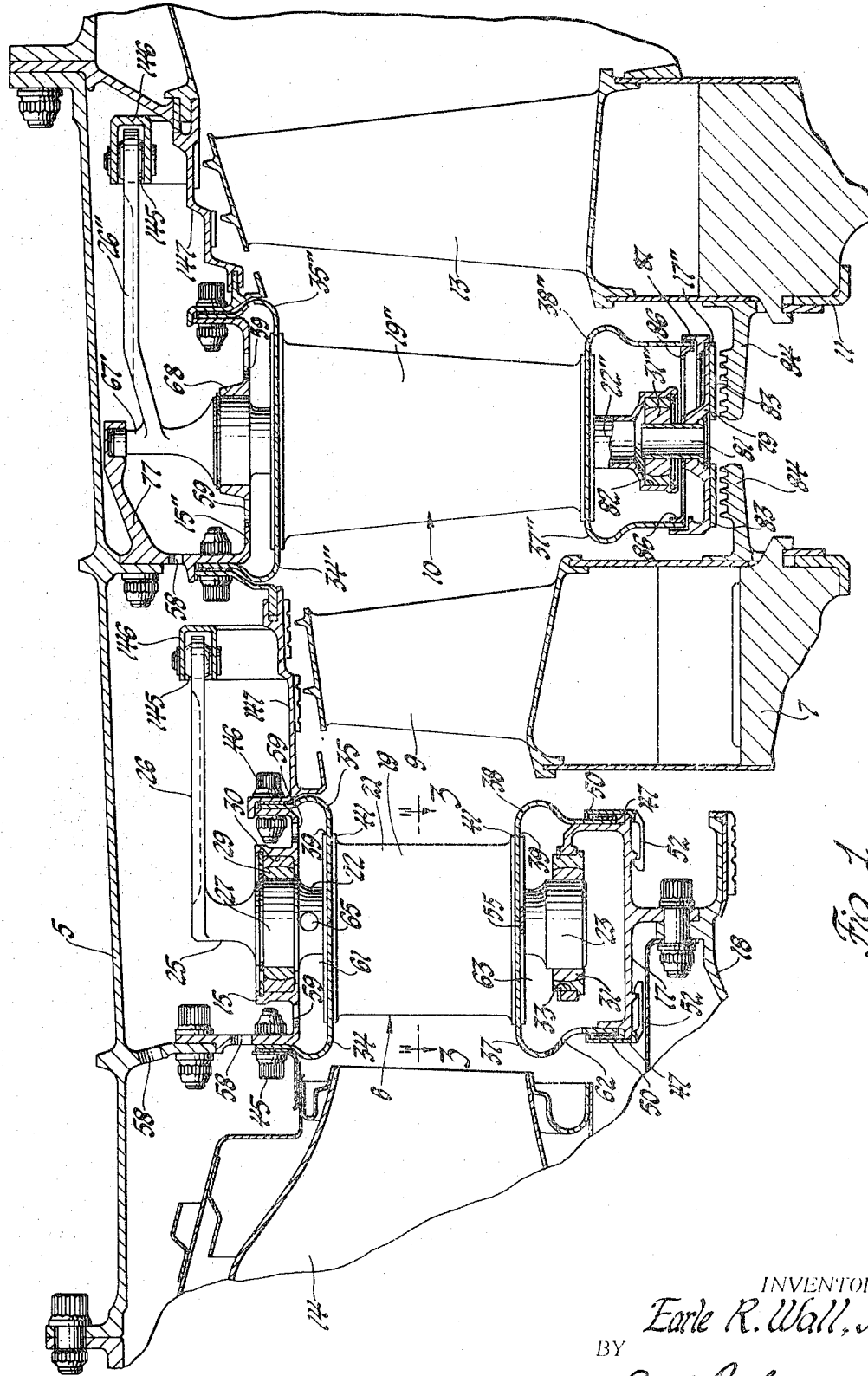

FIG. 1 illustrates a turbine generally of known type in which variable turbine nozzles according to forms of my invention are illustrated and in which other nozzle arrangements to be described could be incorporated. The two stage turbine includes a case 5, a first stage nozzle 6, a first stage wheel 7, bearing blades 9, a second stage nozzle 10, and a second stage wheel 11 bearing blades 13. Only the rims of the turbine wheels are illustrated, there being no need to show the portions of the turbine adjacent the axis of rotation, which may be of any suitable known type. A combustion liner 14, partially shown, which may be annular, discharges hot gas into the first stage nozzle 6 from which it flows through blades 9, nozzle 10, and blades 13, and to an exhaust, or further turbine stages, not illustrated.

The first stage nozzle 6 comprises an outer mounting ring or structural ring 15 bolted to the case 5 and an inner mounting ring or structural ring 17 bolted to a flange on the inner casing 18 of the combustion apparatus, which is rigidly supported from the outer case 5. Thus the mounting rings 15 and 17 are positively located in the engine.

The nozzle includes an annular cascade of variable setting vanes 19 supported on the rings 15 and 17 by spherical sliding contact bearings 29 and 31, respectively. These bearings are spherical to accommodate relative axial movement of the two mounting rings caused by differential expansion within the engine.

Each vane 19 (see also FIGS. 3 and 4 and FIG. 2 directed to a modified structure) comprises a porous airfoil shaped wall 21 defining the hollow vane 19 and a hollow shaft 22 to which the wall 21 is fixed by brazing or otherwise. The shaft 22 has a cylindrical inner end 23 and is integral with a shaft extension 25 and an operating arm 26. A cylindrical bearing mount portion 27 between shaft 22 and a shaft extension 25 mounts a spherical sliding contact bearing 29 for each vane, each bearing 29 being mounted in a cylindrical socket 30 extending from the ring 15. Bearing 29 bears against a shoulder on the shaft 22 and a shoulder on the ring 15 and is retained axially with respect to both the mounting ring and shaft by snap rings. Thus, the vane is located radially of the engine at this point. The shaft end 23 of the vane is slidably mounted in a spherical bearing 31 fixed by a snap ring in a socket 33 in the inner mounting ring 17. Because of the sliding connection of shaft end 23 and the spherical nature of the bearing, the two shrouds may move axially of the engine or radially of the engine with respect to each other in response to differential expansion or loads without causing binding of the bearings 29 and 31 about which each vane is rotated to vary its setting angle.

The outer shroud includes a facing ring of porous metal made up of a forward or upstream ring 34 and a rear or downstream ring 35, these meeting approximately at the axes of rotation of vanes 19. Similarly, the inner shroud includes a facing of porous metal defined by a forward ring 37 and a rearward downstream ring 38, these also meeting in a plane approximately at the axes of rotation of the vanes. The two facings define the flow path through the turbine nozzle and are in contact sealing relation with the vanes so that the vanes cover the openings in the facings which necessarily have clearance to allow rotation of the vanes to the desired extent about the axis of shaft 22. Note flanges 39 and 41 at each end of the airfoil 21 which embrace the material of rings 37 and 38 and cover the edges of notches 43 and 44 (FIG. 4) provided in the margins of rings 37 and 38 to receive each vane.

Figure 4:
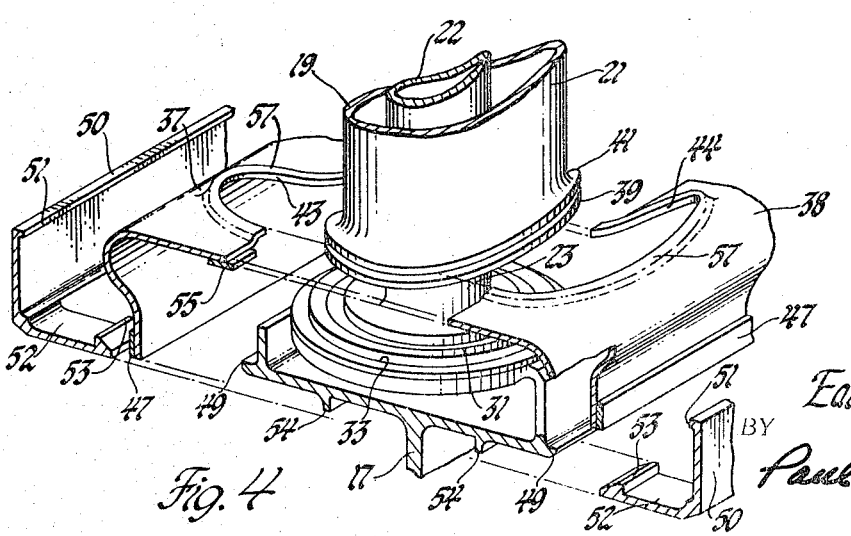
FIG. 4 is an exploded axonometric view of the first stage nozzle inner shroud structure of FIG. 1.

The rings 34 and 35 are retained against forward and rearwardly facing flanges of the mounting ring 15 by rings of bolts 45 and 46. The inner facing rings 37 and 38 are mounted with freedom for some radial movement against forward and rearwardly facing flanges of the mounting ring 17. Referring particularly to FIG. 4, each of the rings 37 and 38 has a stiffening strip 47 welded or otherwise fixed to it. This strip is trapped between a lip 49 on the support and a snap ring 50 which has a flange 51 at its outer edge. Each snap ring 50 bears a number of circumferentially spaced axially extending spring fingers 52, each of which has at its free end a detent 53 which snaps over and locks against ridge 54 on the ring 17. Thus, the inner facing ring can move radially inward and outward to a certain extent as the vane slides inward and outward in the bearing 31, but is located axially of the engine. Strips 55 fixed to ring 37 between the vanes may underlie the margin of ring 38 to improve sealing between the parts.

The means by which the vanes are rotated in unison will be described later. It will be noted that the vanes of nozzle 6 are straddle mounted; that is, positively located at both their inner and outer ends. In other arrangements to be described, the vanes are cantilever mounted; that is, they are rigidly supported at their outer ends and support the inner shroud from the vanes.

For a good fit between the rings 37 and 38 and the flanges on the vane, the rings are embossed to provide a flat portion or surface 57 so that good contact is maintained between the vane and the ring and interference to vane rotation is obviated.

Cooling air for the first stage nozzle may be provided by combustion chamber jacket air flowing from the compressor of the engine (not illustrated) past the combustion liner 14. Holes 58 in the case 5 and the mounting flange of the outer mounting ring 15 and holes 59 through the outer mounting ring admit air to a chamber 61 between the outer mounting ring and its facing. Holes 62 in the facing ring 37 admit combustion chamber jacket air to a chamber 63 between the inner facing and the inner mounting ring. This air can flow outwardly through the porous facings for transpiration cooling of both facings. It also may flow into the vanes which are preferably porous and out through the walls of the vanes, or be otherwise used for cooling the vanes. As illustrated, the shaft 22 has an air entrance hole 65 and air discharge holes 66 (FIG. 3) from which the air is led into the interior of the vane 19. The ends of the vanes 19 may be open or closed as desired.

Figure 2:
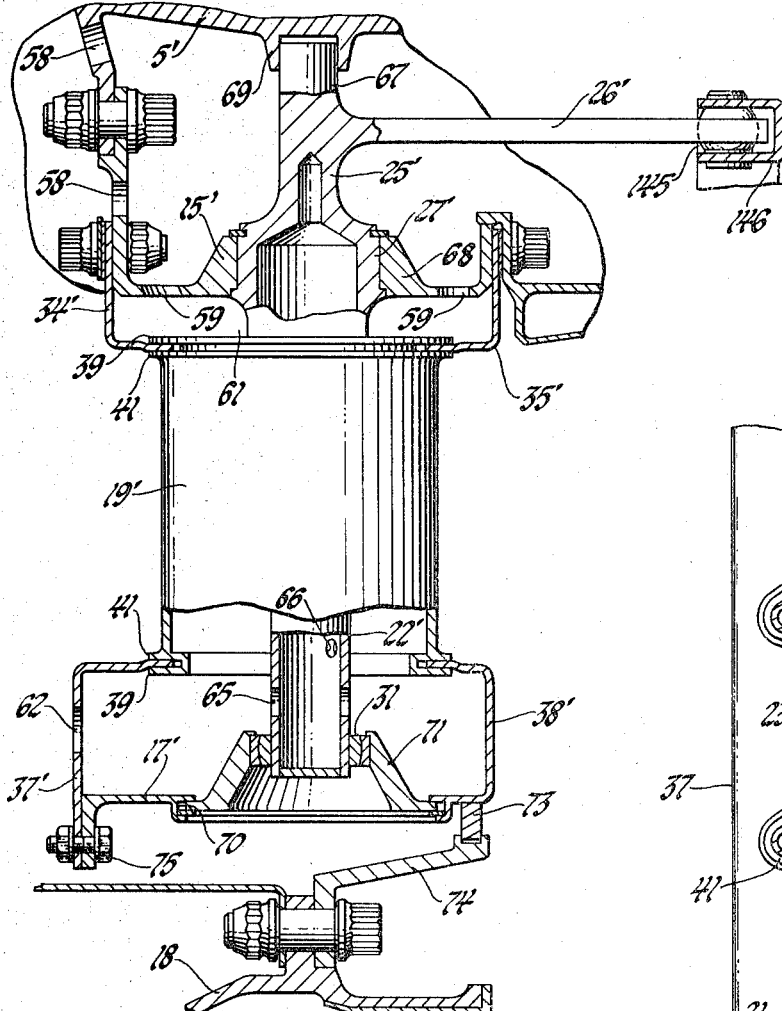
FIG. 2 is a partial view of a turbine taken on a plane similar to that of FIG. 1 and illustrating a third form of variable setting nozzle.
Figure 3:
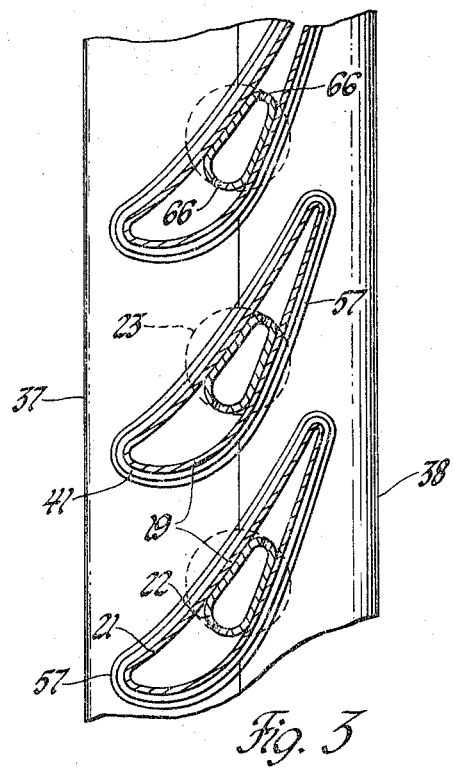
FIG. 3 is a sectional view of a turbine nozzle taken on the plane indicated by the line 3—3 in FIG. 1.

FIG. 2 shows a modification of the first stage nozzle which differs from that shown in FIGS. 1 and 4 primarily in that the vanes are cantilever mounted; that is, the vanes are supported from their outer ends and the inner shroud is supported by the inner ends of the vanes. In FIG. 2, structures corresponding to those of FIG. 1 have the same reference numerals with primes. This will eliminate unnecessary duplication in the description.

The vanes 19' of FIG. 2 are cantilever mounted from the outer mounting ring 15', which includes a boss 68 bored to provide a plain bearing for the shaft portion 27' of the shaft 22'. This shaft includes a continuation 67 which is rotatably journaled in a bored boss 69 on the interior of the case 5' so that the shaft 22' is supported at two points of its length, both outboard of the vanes 19'. The arrangement for admitting air through the outer support ring 15' and the structure and mounting of the facing rings 34' and 35' are essentially the same as previously described. The inner mounting ring 17' embodies a somewhat different arrangement for support of the bearing between the shaft 22' and the mounting ring 17'. In this structure, sockets 70 are provided for mounting cones 71 which support spherical bearing 31 engaging the shaft 22'. Holes 65 to admit air to the shaft 22' are provided within the inner shroud structure and holes 62 are provided in the forward facing ring 37' for admission of cooling air. Bearing 31 is a spherical bearing to accommodate any tendency of the shroud ring to cock relative to the vane shafts.

The seal between the inner shroud and the inner casing 18 of the combustion chamber is a piston ring seal 73 disposed in a circumferential groove in a ring 74 mounted on the inner casing 18. This seal ring bears against the radially inner surface of facing ring 38'. In this structure, the ring 37' is fixed to ring 17' by bolts 75 and the ring 38' may be attached by means such as spring fingers 90 (to be described in connection with the second stage nozzle illustrated in FIGS. 1 and 5) extending from ring 38'. Here, as previously, the rings which define the shroud facings are porous and the vanes 19' are preferably porous. The vanes have flanges 39 and 41 which cooperate with embossments on the facing rings as previously described.

Figure 5:
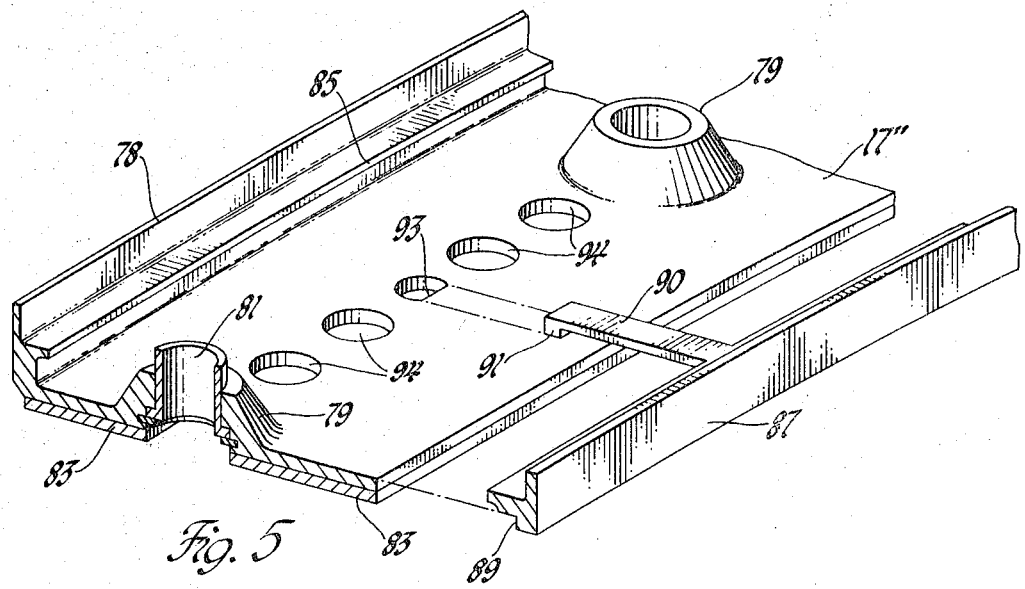
FIG. 5 is an exploded axonometric view of a portion of the second stage nozzle inner shroud structure of FIG. 1.

FIGS. 1 and 5 are directed particularly to another form of nozzle with cantilever mounted vanes, in this case, those of the second stage in FIG. 1. In the second stage nozzle, it is not feasible to support the inner shrouds otherwise than through the vanes. Structures in the nozzle 10 of FIG. 1 which correspond to those of the first stage nozzles previously described bear the same reference numerals with double primes so as to minimize duplication of description. In this form, the socket or bearing for the shaft extension 67' is provided in a flange 77 which is an integral part of the mounting ring 15'' which, like the ring 15, is bolted to the interior of the case 5. The arrangements of the facing on the outer shroud and the provision of flanges on the vanes 19'' to embrace and seal against these facings, as well as against the facings on the inner shroud may be the same as those previously described.

Inner shroud ring 17'' is a generally flat ring having a radially outwardly extending flange 78 at its forward or upstream edge. A boss 79 is provided at the location of each vane axis. This is bored to provide a support for a headed hollow pin or pintle 81 retained by a snap ring. A spherical bearings 31'' slidable on the pintle 81 is retained in a socket 82 at the inner end of vane shaft 22''. This structure makes it possible to insert the pintle into the bearings to locate the inner shroud on the vanes after the vanes have been mounted on the other shroud. The inner surface of ring 17'' mounts two sealing strips 83 of abradable or honeycomb material which are provided to cooperate with labyrinth seal rings 84 on the turbine wheels 7 and 11. The form of the forward and rear facing rings 37'' and 38'' is much the same as that of the first stage in FIG. 1. The forward ring is mounted behind the flange 78 and riding on the outer surface of a ridge 85 extending inwardly from that flange. A spacer ring 86, which may be segmented, bears against the rear or inner surface of the ring 37" and has openings to clear the pintles 81. The rear edge of ring 86 bears against the inner surface of the facing ring 38". The outer surface of ring 38" bears against and is retained by a detachable flange 87, the inner surface of which rides on the outer surface of ring 17" and which has a flange 89 bearing against the rear edge of ring 17". Detachable flange ring 87 is retained by a number of spring fingers 90 having depending tangs 91 which spring into openings 93 in the ring 17". Ring 17" also is provided with a ring of holes 94 which admit air to the interior of the inner shroud from the space between wheels 7 and 11.

FIGS. 6 through 11 illustrate various structures to provide the porous facing in connection with vanes which have generally rectangular platforms to engage in sealing relation with the inner and outer faces of the facing rings. The structures illustrated in these figures are all facings for the outer shroud, but the same types of structure can clearly be employed in the inner shroud, or in both.

Figures 6, 7:
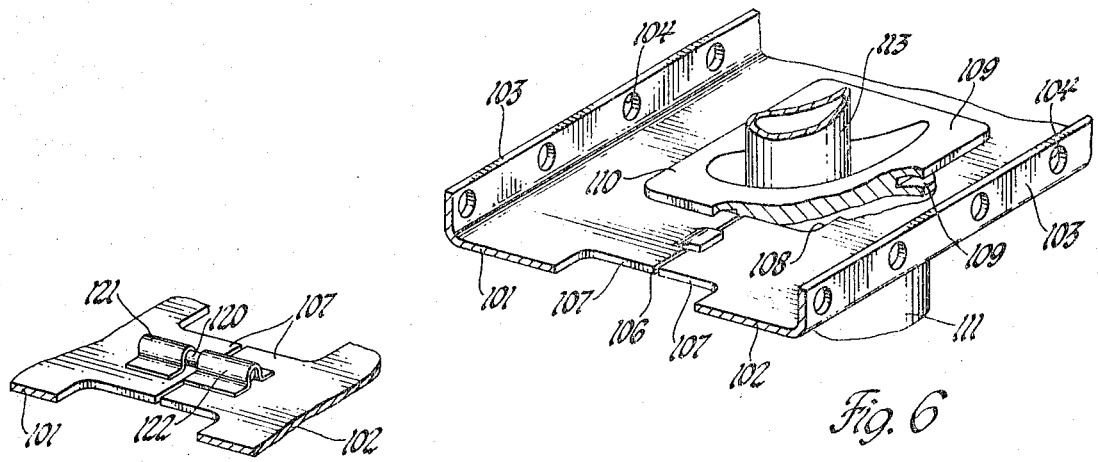
FIG. 6 is a partial axonometric view of one form of outer nozzle shroud structure.
FIG. 7 is a fragmentary view illustrating a modification of the structure of FIG. 6.

FIG. 6 illustrates an upstream facing ring 101 and a downstream facing ring 102 both of which have outwardly extending flanges 103 with holes 104 for bolts such as 45 and 46 in FIG. 1 to retain them on the mounting ring. These rings meet at a mean plane 106 and have cutouts 107 in their mating edges which, when these rings are put together, define round-cornered rectangular openings 108 for the flanges 109 on the platforms 110 at the end of the vane. The flanges overlie the inner and outer surfaces of the facings, and there is sufficient clearance between the edges of the openings 108 and the recess between the flanges to allow the vane 111 to rotate to the desired extent. The vane may be rotated by a shaft 113 corresponding to the shaft 22 of FIG. 1.

FIG. 7 illustrates a form of alignment arrangement between the rings 101 and 102 defined by a locating pin 120 fixed to ring 101 by a strap 121 and entering into the socket defined by a strap 122 welded or otherwise fixed to the other ring. Such locating pin arrangements may be provided at any desired number of points spaced around the rings.

Figure 8:
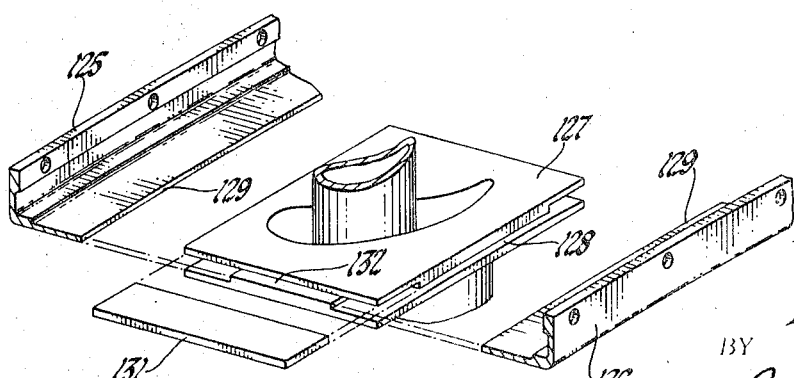
FIG. 8 is a view similar to FIG. 6 of a still different structure of the outer nozzle shroud.
Figure 9:
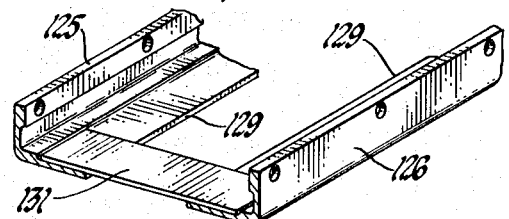
FIG. 9 is a fagmentary view of a further species of shroud facing structure for an outer shroud.

FIG. 8 illustrates a different structure for the same purpose as that illustrated in FIG. 6. The upstream facing ring 125 and downstream facing ring 126 are essentially angle iron rings with porous faces exposed to the motive fluid. The vane has a platform 127 having arcuate slots 128 in its forward and rearward edges to mate with the portions 129 of the rings 125 and 126. Porous sealing strips 131 disposed between each two adjacent vane platforms are lodged in fore and aft slots 132 in the edges of the platforms 127. The ends of the strips 131 overlie the portions 129 of the facing rings, the offset of slots 132 to slots 128 being apparent in the drawing. In this case, the strips 131 are free except that they are captured between the blade platforms. They are free to move to a limited extent and to pivot as the vanes are rotated about their axes. FIG. 9 illustrates the relative position of a strip 131 and rings 125 and 126, the vane being omitted in this figure.

Figure 10:
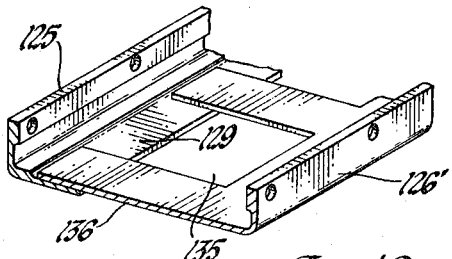
FIG. 10 is still another species of shroud facing structure for an outer nozzle shroud.

FIG. 10 illustrates a structure in which the rectangular openings 135 for the vane platforms is defined between the portion 129 of a forward ring 125 and tongues 136 extending from a downstream ring 126' and overlying the ring portion 129.

Figure 11:
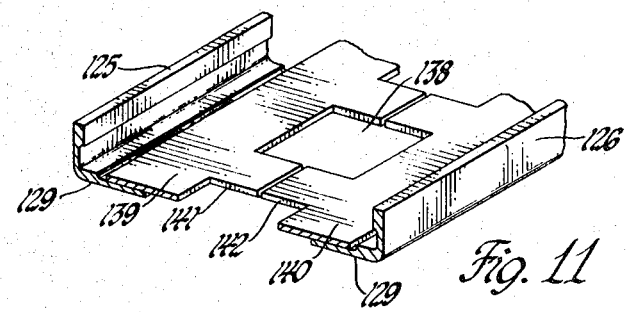
FIG. 11 illustrates still another structure of outer nozzle shroud facing.

FIG. 11 illustrates a structure in which the openings 138 are defined between two free strips 139 and 140 riding on the flanges 129 of facing rings 125 and 126. Strips 139 and 140 bear tongues 141 and 142, respectively, which abut at the center of the facing ring.

Suitable configuration of the slots in the blade platform to accommodate these sealing arrangements of FIGS. 10 and 11 will be readily apparent. The portions of the structures exposed to the gas stream are preferably porous.

Figure 12:
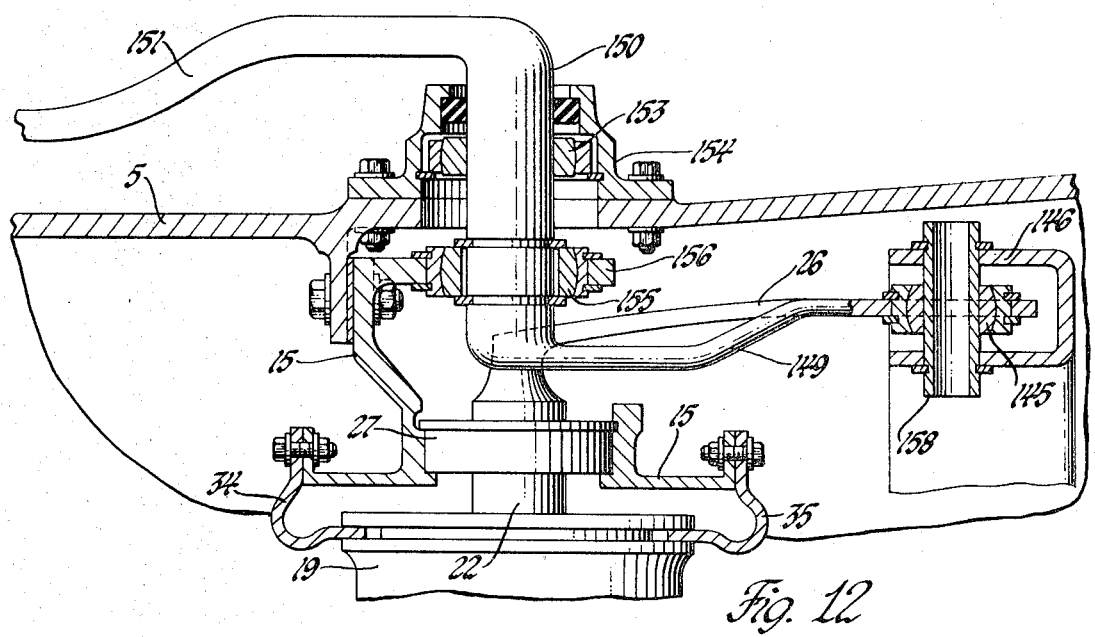
FIG. 12 is a sectional view taken on a plane containing the axis of rotation of the turbine illustrating structure for rotating the vanes in unison.
Figure 13:
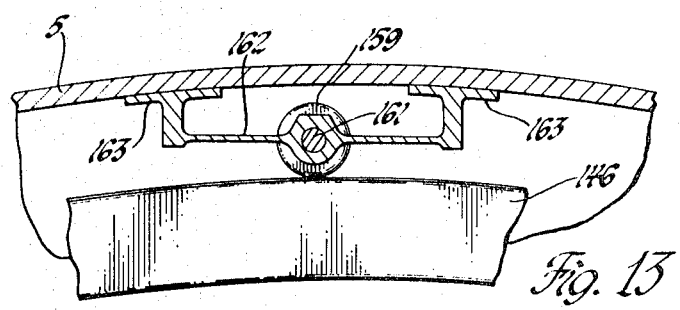
FIG. 13 is a fragmentary view taken on a plane normal to the turbine axis of illustrating a support or guide for a unison ring by which the vanes are rotated.

Means for rotating the vanes of a given stage in unison to change their setting angle is shown principally in FIGS. 12 and 13 and also in FIGS. 1 and 2.

It will be noted from FIGS. 1 and 2 that the vane actuating arm 26, 26', or 26" is coupled through a spherical bearing arrangement 145 to a unison ring 146, this being a continuous ring, which may be fabricated of a number of sections, extending around the turbine between the case 5 and a shroud 147 which encloses the rotor blades. When this ring is rotated around the axis of the turbine, the setting angles of the vanes are changed concurrently.

Referring now to FIG. 12, this unison ring is driven by a number of arms 149 extending from shaft 150. Shaft 150 bears arms 151 external to the case 5 which may be coupled to any suitable actuator under any desired type of control. The means for actuating the arms 151 is not material to the invention. The shaft 150 and arms 149, 151 constitute a structure somewhat similar to a bicycle crank which is journaled in the turbine case on an axis normal to the axis of rotation of the turbine. The shaft 150 in the embodiment illustrated is supported in a first spherical bearing 153 mounted in a cage 154 bolted to the exterior of the turbine case and a second spherical bearing 155 mounted in a bracket 156 extending from the mounting ring 15. A third spherical bearing 145 mounted in the end of arm 149 cooperates with a hollow pin 158 mounted in the unison ring 146. It will be noted in general that the bearings 153, 155, and 145 and pin 158 are secured by snap rings. The arms 149 are disposed between two adjacent vane arms 26. The structure of the nozzle shown in FIG. 12 is identified similarly to the corresponding structures of the first stage nozzle of FIG. 1 and need have no further description.

In many cases it may be desirable to provide circumferentially spaced centering rollers for the unison ring 146. A preferred structure for this purpose is illustrated in FIG. 13 in which the outer surface of the ring is supported by a number of rollers 159 on shafts 161 mounted in slightly flexible webs 162 of brackets having bases 163 bolted or otherwise fixed to the turbine case. The flexibility of web 162 causes a resilient centering action in which the ring 146 and case 5 may expand differentially while preserving the centering action.

It should be clear to those skilled in the art from the foregoing description that my invention provides variable turbine nozzle structure particularly suited to requirements of high temperature machinery and having improved arrangements for cooling the surfaces exposed to the hot motive fluid. It should also be clear that these structures are extremely practicable from the standpoint of fabrication, assembly, and disassembly for repair or inspection.

The detailed description of preferred embodiments of my invention for the purpose of explaining the principles thereof is not to be considered in any limiting sense as many modifications may be made by the exercise of skill in the art.

I claim:

1. A turbine nozzle comprising, in combination, a mounting ring including bearing means for coupling variable-setting vanes to the mounting ring, an annular row of variable-setting vanes coupled to the mounting ring, a facing ring of porous material spaced from the mounting ring to define a chamber between the rings, means for admitting a cooling fluid to the chamber, the facing ring and vanes defining a contact seal between the vanes and facing ring operative to locate the facing ring spanwise of the vanes, and at least one snap ring resiliently locked to the mounting ring locating the facing ring chordwise of the vanes.

2. A nozzle as recited in claim 1 in which the facing ring is provided with plane embossments for sealing contact with the vanes.

3. A nozzle as recited in claim 2 in which the vanes have flanges slidable over the embossments.

4. A nozzle as recited in claim 1 in which the facing ring is defined by an upstream ring and a downstream ring meeting adjacent the plane defined by the axes of rotation of the vanes.

5. A nozzle as recited in claim 1 including means mounting the facing ring with freedom for movement spanwise of the vanes relative to the mounting ring.

6. A nozzle as recited in claim 5 in which the facing ring has flanges at the edges thereof and the mounting means includes a flange fixed on the mounting ring engaging the outer face of one flange of the mounting ring, a spacer ring engaging the inner faces of the facing ring flanges, and a flange on the snap ring engaging the outer face of the other flange of the facing ring.

7. A nozzle as recited in claim 5 including a snap ring at each edge of the facing ring.

8. A turbine nozzle comprising, in combination a mounting ring including bearing means for coupling variable-setting vanes to the mounting ring, an annular row of variable-setting vanes coupled to the mounting ring, a facing ring of porous material spaced from the mounting ring to define a chamber between the rings, means for admitting a cooling fluid to the chamber, the facing ring and vanes defining a contact seal between the vanes and facing ring operative to locate the facing ring spanwise of the vanes, and means connecting the facing ring to the mounting ring with freedom for movement of the facing ring relative to the mounting ring in the direction spanwise of the vanes.

9. A nozzle as recited in claim 8 in which the said connecting means locates the mounting ring clockwise of the vanes.

10. A nozzle as recited in claim 8 in which the facing ring is defined by an upstream ring and a downstream ring meeting adjacent the plane defined by the axes of rotation of the vanes.

11. A variable turbine nozzle comprising, in combination, a first shroud, a second shroud, and an annular array of vanes extending from shroud to shroud, the vanes being rotatable about axes extending spanwise of the vanes through the shrouds, each shroud comprising a structural shroud ring to which the vanes are pivotally coupled and a shroud facing defining a boundary of the motive fluid path through the nozzle, the facing being porous and being spaced from the shroud ring to define a chamber between the shroud ring and facing, means for admitting cooling fluid to the chamber for flow through the facing into the motive fluid path, and means defining a sealing overlap between each vane and the facing, each facing comprising an upstream ring and a downstream ring abutting substantially at the vane rotation axes.

12. A nozzle as recited in claim 11 including snap ring means mounting the facing rings to the structural shroud ring on one of the shrouds for ready mounting and demounting of the facing rings.

13. A variable-setting stator vane ring for a turbomachine comprising, in combination, first and second shrouds defining the boundaries of the motive fluid path through the ring, an annular cascade of variable-setting vanes extending from ring to ring and coupled to the rings, each vane including an airfoil and a tetragonal platform at each end of the airfoil, means rotatably coupling each vane to both shrouds for rotation about an axis extending spanwise of the vane from shroud to shroud; each platform having edges extending circumferentially of the ring and edges extending axially of the ring; each shroud including a portion engaging and overlapping the said circumferentially extending edges and a portion engaging and overlapping the said axially extending edges.

14. A structure as recited in claim 13 in which the edges of the platform are slotted to receive the said overlapping shroud portions.

15. A structure as recited in claim 14 in which the portions engaging the axially extending edges are free strips caged in the slots of the platforms.

16. A structure as recited in claim 14 in which the portions engaging th e circumferentially and axially extending edges are defined by strips extending circumferentially of the ring bearing tongues extending axially of the ring.

17. A structure as recited in claim 13 in which the portion engaging one circumferentially extending edge and the portion engaging the axially extending edges are defined by a first strip and the portion enaging the other circumferentially extending edge is defined by a second strip.

18. A structure as recited in claim 13 in which the said portions are porous and means are included to supply air to the said portions.

19. An axial-flow turbomachine comprising, in combination, an annular case, an annular shroud mounted within and substantially coaxial with the case, an annular cascade of variable-setting vanes each said vane being pivotally mounted on the shroud for rotation about an axis extending spanwise of the vane, an actuating arm fixed to each vane extending between the case and the shroud, a unison ring coupled to the said actuating arms, radially yieldable bearing means spaced circumferentially of the case supporting the unison ring from the case, and a plurality of input means extending through the case coupled to the unison ring to rotate the ring about its axis.

20. A machine as recited in claim 19 in which the bearing means are connected to the case by springs.

21. A machine as recited in claim 19 in which the bearing means comprises a plurality of supporting rollers and leaf springs connecting the rollers to the case.

References Cited

UNITED STATES PATENTS

| | | | |
|---|---|---|---|
| 3,075,744 | 1/1963 | Peterson | 415—115 |
| 3,362,681 | 1/1968 | Smuland | 415—115 |
| 3,433,015 | 3/1969 | Sneeden | 416—231 |

FOREIGN PATENTS

| | | | |
|---|---|---|---|
| 946,995 | 1/1964 | Great Britain | 415—160 |
| 1,290,012 | 2/1962 | France | 415—134 |

HENRY F. RADUAZO, Primary Examiner

U.S. Cl. X.R.

416—231; 415—160, 134